United States Patent
Swartz et al.

[11] Patent Number: 5,993,593
[45] Date of Patent: Nov. 30, 1999

[54] HIGH-TEMPERATURE, HEAT-SEALED PRODUCTS AND METHODS AND MEANS FOR THEIR MANUFACTURE

[75] Inventors: Henry D. Swartz, Chestnut Hill; Gary P. Magnant, Rockport; George Corey, Newton, all of Mass.

[73] Assignee: Heat Sealing Technology, Inc., Chestnut Hill, Mass.

[21] Appl. No.: 08/757,694

[22] Filed: Dec. 3, 1996

[51] Int. Cl.$^6$ ................................................. B32B 31/00
[52] U.S. Cl. ..................................... 156/308.4; 156/282
[58] Field of Search ................................ 156/282, 308.4, 156/275.1

[56] References Cited

U.S. PATENT DOCUMENTS

| | | | |
|---|---|---|---|
| 2,354,714 | 8/1944 | Strickland, Jr. | 156/73.1 |
| 2,681,097 | 6/1954 | Gray | 156/498 |
| 3,066,064 | 11/1962 | Pommer | 156/82 |

*Primary Examiner*—Francis J. Lorin
*Attorney, Agent, or Firm*—Perkins, Smith & Cohen; Jerry Cohen; Harvey Kaye

[57] ABSTRACT

Apparatus for manufacturing heat sealed products from high temperature film materials exhibiting superior barrier properties, such as films made from LCP resin. The apparatus has in relevant part a first compression member having a heating element that is capable of being continuously or intermittently heated to a temperature of about 300° C. (c. 575° F.) backed by a layer of material capable of supporting the heating element, a second compression member that opposes the first compression member and having an electrically conductive tubular sealing element, capable of being flash-heated by means of a pulse of electric current to a temperature of about 425° C. (c. 800° F.) and immediately flash-cooled to room temperature or below by means of forcing vortex-chilled coolant fluid through the tubular lumen, backed by a layer of material capable of supporting the sealing element, and two floating sheets or tapes of high-temperature release material disposed therebetween.

47 Claims, 12 Drawing Sheets

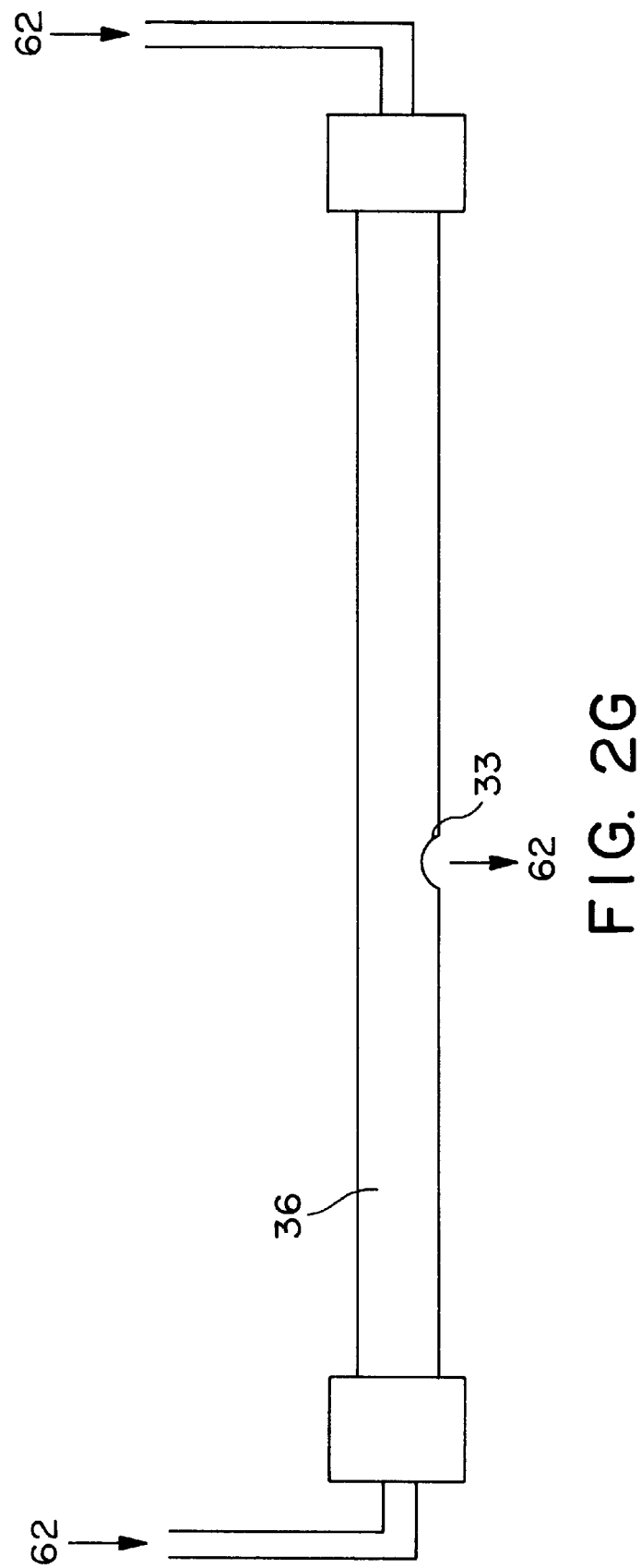

HIGH-TEMPERATURE, HEAT-SEALED PRODUCTS AND METHODS AND MEANS FOR THEIR MANUFACTURE

FIELD OF THE INVENTION

The present invention relates generally to high temperature heat seals, such as those made between films manufactured from high-temperature thermoplastic resins like liquid crystal polyester, and methods and means of their manufacture.

BACKGROUND OF THE INVENTION

While forming heat seals between films made from low-temperature thermoplastics, such as PET, LDPE, MDPE, and HDPE, is well known, current technology does not permit the formation of heat seals between films made from high-temperature materials or between high- or low-temperature films and non-planar structural elements, such as molded thermoplastic valves.

One class of high-temperature materials that are not currently capable of being heat-sealed is high-temperature thermoplastics. Foremost among high-temperature thermoplastics is a subclass generally referred to as "liquid crystal polyesters" or "liquid crystal polymers" (hereinafter "LCP"), that, when formed into films, exhibit superior heat tolerance and impermeability characteristics. There is widespread interest in LCP films because, unlike films made from other high-performance polymers, such as polyetheretherketone (PEEK), various polysulfones (PSFs), and polyetherimide (PEI), which are based on exotic and inherently expensive chemistries, LCP films are based on polyester chemistry, which is well understood in resin or extruded form. Thus, although LCP films are currently expensive due to their limited usefulness, their cost is expected to decrease with increasing demand.

LCP films are suitable for the most demanding applications. They exhibit low moisture absorption, inherent flame retardance, high thermal stability (e.g., Amoco Performance Products's XYDAR® SRT-300, an unmodified commercial LCP, has a 1.82 MPa heat distortion temperature of 355° C., higher than any known conventional engineering thermoplastic even with the benefit of fiber reinforcement), high radiation resistance, and ceramic-like resistance to chemical attack and reagent permeation.

LCP films offer unsurpassed barrier performance among polymeric materials, especially in critical applications, such as food and pharmaceutical packaging, fiber-optic jackets, and fuel tanks. The barrier properties exhibited by LCPs are orders of magnitude greater than those of conventional barrier resins, such as EVOH, PET, metallized PET (MYLAR®), and PVDC, the latter being the standard-bearer of general purpose barrier polymers. E.g., a film prepared from Hoechst Celanese VECTRA® resin is ten times more resistant to oxygen and water permeation than PVDC and 100 times more resistant to oxygen permeation and almost twice as resistant to water permeation than PCTFE, which itself is among the best of all conventional barrier polymers.

Similarly, and unlike traditional structural packaging materials (i.e., co-extruded films), such as LDPE, MDPE, HDPE, PP, and PET, LCPs offer thermal stability sufficient for hot-filling and retorting (up to about 200° C.) in food packaging and are sterilization-compatible in addition to their superior barrier properties. LCP films are likewise suitable for medical packaging of appliances and devices, biofluids, and pharmaceuticals due to their ultra-low permeability, biocompatibility, and sterilization compatibility. Finally, LCP films are also superior to polyimide films, such as Du Pont's KAPTON®, in electronic substrate applications, such as in flexible circuits.

However, because of their high melting points-typically about 260° C. (c. 500° F.) to about 425° C. (c. 800° F.)—and complex linear molecular structure, LCP films exhibit poor adhesion/cohesion properties. Indeed, all thermoplastic films that have a melting point greater than about 260° C. (c. 500° F.), and/or chemical properties which make them difficult to reconsolidate using temperature and pressure, and a total thickness greater than 0.080", are difficult, if not impossible to join. The only exception among these materials is PVC, which can be RF or UV welded due to its unique electrical properties. As a result, there is currently no commercially available processes or machines that can accomplish a viable weld or seal of films made from most high-temperature thermoplastic materials due to the extreme temperatures required (above about 500° F.) and, accordingly, there are no products manufactured from high-temperature thermoplastic films. Various forms of cold adhesion, including ultrasonic bonding, are also ineffective for sealing high-temperature thermoplastic films such as liquid crystal polymer.

Several forms of heat-sealing apparatus for sealing products comprising low-temperature thermoplastic films, with thermal management, are disclosed in U.S. Pat. Nos. 4,075,818 issued 28 Feb. 1978 to Wright et al. and, 4,359,361 issued 16 Nov. 1982 to Wright.

The devices described in both the '818 and '361 patents comprise opposed sealing jaw assemblies, one of which is a backup jaw assembly and the other of which is a heat applying jaw assembly, the latter including an elongated sealing and cutting element which is workable against the former. The devices further comprise means to heat the sealing and cutting element and, in at least one of the jaw assemblies, one or more cooling veins disposed generally immediately adjacent the working face of the at least one jaw assembly and generally contiguous to and along the sealing and cutting element, at least in the closed jaw position. The one or more cooling veins are in fluid communication with, in various embodiments, a stream of pressurized gas, refrigerated gas, or dual streams of cooled gas originating from a heat exchanger having a cooling coil that cools one gas stream and an exhaust means in fluid communication with a vortex tube that cools the other gas stream.

These devices have several characteristics which lead to problems. First, the preferred release material covering the jaw assemblies is glass tape or cloth coated with polytetrafluoro-ethylene (PTFE), which is sold under the trademark TEFLON®. PTFE is a well-known solid lubricant and is used in the '818 and '361 patents to prevent adhesion to the heat sealing element of the thermoplastic film being heat sealed. Although the PTFE coating allows for non-stick heat sealing of common, lower temperature thermoplastics, such as polyethylene and its derivatives; polyvinylic materials, such as polyvinyl alcohol (PVA) and polyvinyl chloride (PVC); and hybrid materials, such as ethylene vinyl acetate (EVA), it cannot be used in the manufacture of heat-sealed high temperature film products, as it is an ineffective release material at about 260° C. (c. 500° F.) and melts at 327° C. (c. 620° F.) and vaporizes well below the higher LCP melting point of high performance LCPs with melt-processing temperatures of about 425° C. (c. 800° F.). A related drawback of these devices is their inability quickly to dissipate the extreme amounts of heat needed to seal high temperature films, such as those made from LCP.

A general limitation in all relevant prior art devices is their inability to manufacture products comprising high temperature film material. A related limitation is the failure of known devices to incorporate valves, probes, leads, tubes, and the like into a heat-sealed product such that an hermetic seal is formed between the film layers and the incorporated element.

Accordingly, it is an object of this invention to overcome the above illustrated inability of extant devices to heat-seal film materials manufactured from thermoplastics having melting points in excess of about 260° C. (c. 500° F.) by providing heat sealing apparatus capable of changing the material to be sealed to its liquid phase in the seal region and reconsolidating the material to form the seal.

It is another object of this invention to provide heat sealing apparatus that does not experience thermal breakdown at the high temperatures required to heat seal LCP film layers having a thickness totaling about 0.080".

It is yet another object of the present invention to provide high-temperature heat sealing apparatus that enables the sealed product to fully release from the sealing element after sealing is complete without damaging the seal.

It is a further object of the present invention to provide apparatus capable of producing a heat seal with and/or without cutting the material to be sealed.

It is yet a further object of the invention to provide heat sealed products comprising high-temperature thermoplastic film material, such as made from LCP resin.

It is a still further object of the present invention to provide heat-sealed bags made from high temperature films and having valves, probes, leads, tubes, and the like incorporated into the heat-sealed bag such that an hermetic seal is formed between the film layers and the incorporated element.

SUMMARY OF THE INVENTION

The foregoing objects are met by modified conventional manufacturing machinery designed for use with low-temperature thermoplastic film. In its simplest form, the present invention comprises apparatus for manufacturing heat-sealed products from high-temperature film materials having melting points in excess of about 260° C. (c. 500° F.), such as those made from LCP resin.

In one embodiment, the apparatus has, in relevant part, a first compression member having a heating element that is capable of being heated and held, or pulsed, to a temperature of about 300° C. (c. 575° F.) backed by a layer of material capable of supporting the heating element, a second compression member that opposes the first compression member and having an electrically conductive tubular sealing element, capable of being flash-heated by means of a pulse of electric current to a temperature of about 425° C. (c. 800° F.) and immediately flash-cooled to room temperature or below by means of forcing chilled coolant fluid, such as vortex-chilled air, through the tubular lumen, backed by a layer of material capable of supporting the sealing element, and two floating sheets or tapes of high-temperature release material disposed therebetween.

In this way, the workpiece to be sealed may be disposed between the two floating sheets or tapes of high-temperature release material and isolated from the compression members. Polyimide film has been found to be an optimal high-temperature release material that is suitable for isolating the sealing elements from most films to be sealed. However, any high-temperature material that is thermally and chemically incompatible with both the respective compression members and the material to be sealed, and which is capable of transmitting to the workpiece the extreme heat energy needed to achieve an hermetic seal may be used.

Unlike the apparatus claimed in the '818 and '361 patents, the apparatus of the present invention does not require a heat exchanger, which is an impediment to the high temperature heat sealing function. Rather, the chilled coolant fluid is now directly channeled to the high-temperature sealing compression member. In addition, the present invention employs shaped, tubular sealing elements independent of any release material.

In a first step of manufacture, two or more layers of high-temperature thermoplastic film are pressed against the first sheet or tape of release material and, indirectly, against the first, planar compression member having a heating element that is heated to a constant or intermittent temperature of about 300° C. (c. 575° F.).

This first step is followed in quick succession by a second step that involves compressing the film layers with the second sheet or tape of release material and, again indirectly, against the second, tubular compression member that is then flash-heated to a temperature of about 425° C. (c. 800° F.) and immediately cooled to room temperature or below by means of forcing chilled coolant fluid into the tubular lumen, either continuously or intermittently.

Other objects, features and advantages will be apparent from the following detailed description of preferred embodiments thereof taken in conjunction with the accompanying drawings in which:

BRIEF DESCRIPTION OF THE DRAWING

FIG. 2G is a schematic representation of a fourth embodiment of the sealing element of the present invention;

DETAILED DESCRIPTION OF PREFERRED EMBODIMENTS

I. APPARATUS

Figure 1:
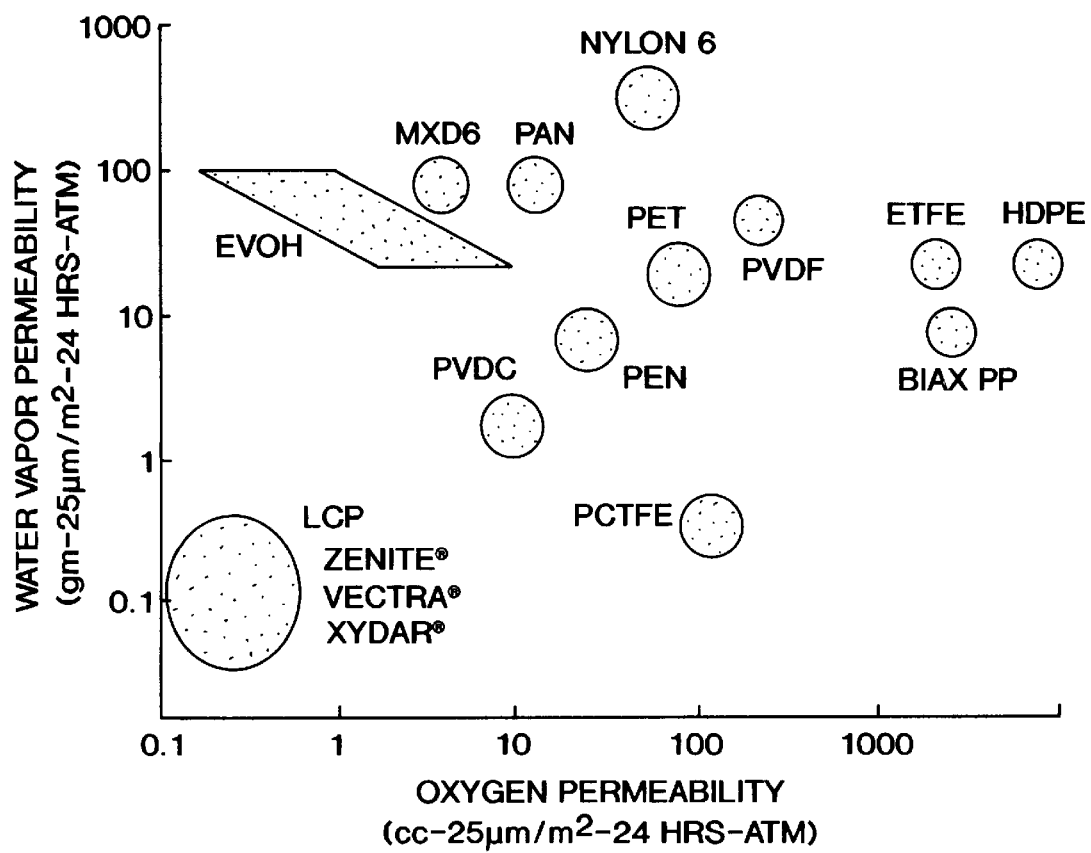
FIG. 1 shows the relative permeabilities to oxygen and water vapor of the leading thermoplastic materials.
Figure 2A:
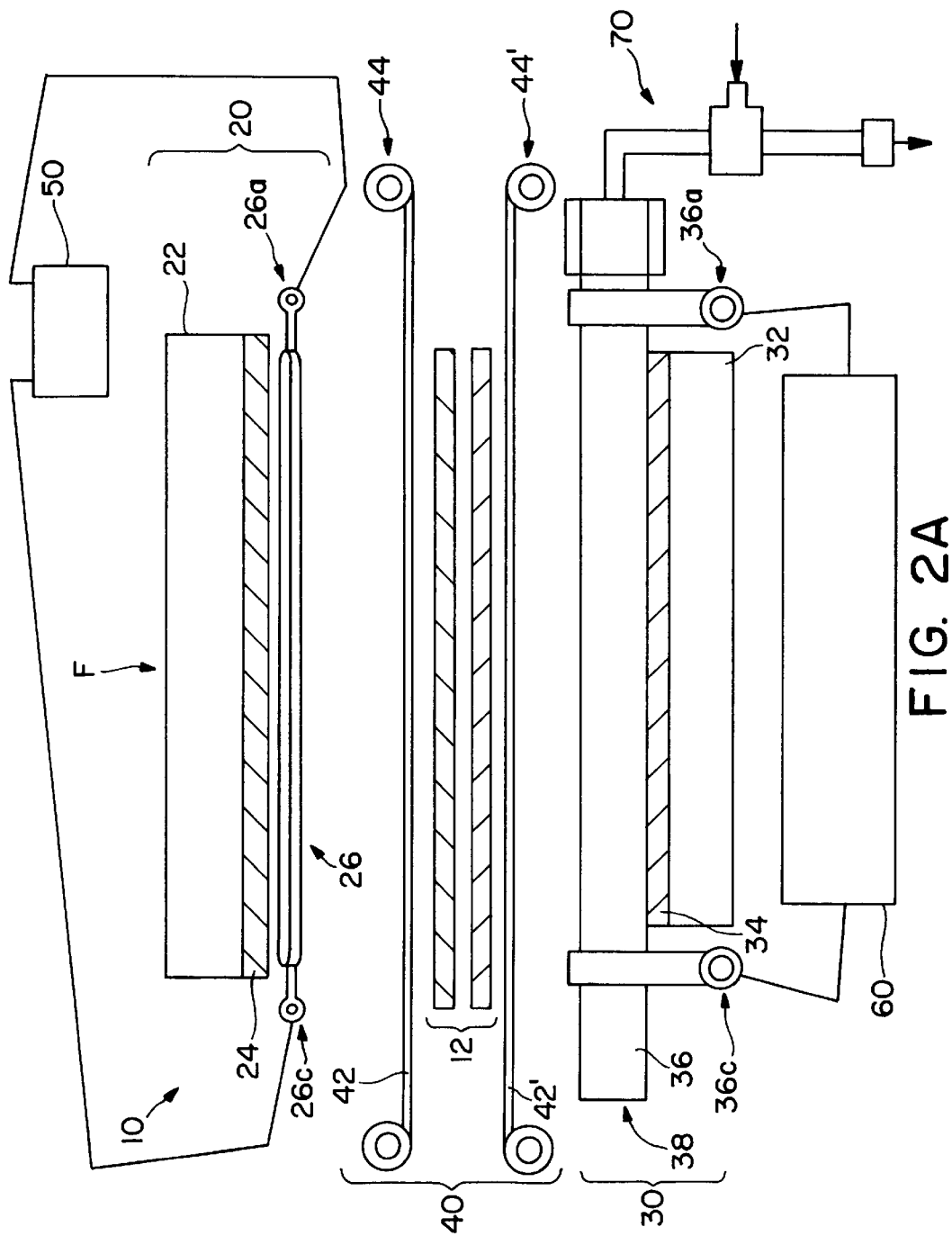
FIG. 2A is a schematic representation of a first embodiment of the apparatus of the present invention.

As shown in FIG. 2A, the present invention contemplates, in a first embodiment, a heat sealing apparatus 10 having a first compression member 20 that has a rigid support element 22 backed by a layer 24 of material capable of supporting a heating element, and a heating element 26 that is capable of being heated and maintained, or pulsed, to a temperature of about 300° C. (c. 575° F.); a second compression member 30 that opposes the first compression member and that has a rigid support element 32 backed by a layer 34 of material capable of supporting a sealing element, and an electrically conductive, tubular sealing element 36 that is capable of being flash-heated to a maximum temperature of about 1100° C. (c. 2000° F.)—although extant developed thermoplastics place a current practical maximum temperature of 425° C. (c. 800° F.)—and immediately cooled to room temperature or below; and a workpiece support assembly 40 disposed therebetween comprising two floating sheets or tapes of high-temperature release material 42 and 42' secured to support elements 44 and 44', respectively. In this way, a workpiece 12 to be sealed may be disposed between the two floating sheets or tapes of high-temperature release material 42 and 42' and isolated from the compression members 20 and 30. It is contemplated that at least one of compression members 20 and 30 is capable of movement such that application of a compressive force F transversely to the axis of orientation of the sealing interface biases the movable compression member(s) against workpiece support assembly 40 and, indirectly, workpiece 12.

It is further contemplated that either or both of compression members 20 and 30 may be adapted to cut the sealed materials, as where formation of a bag having a sealed edge is desirable. One means by which layers 11 and 11' of a thermoplastic film may be simultaneously heat-sealed and cut is shown in cross-section in FIGS. 2E and 3E. In this embodiment, sealing element 32 has a ridge 32a being of a thinner-walled construction than the remainder of sealing element 32. Because of this important difference in wall thickness, the electrical resistance through ridge 32a is greater, due to its decreased cross-sectional area. Thus, ridge 32a becomes hotter than the remainder of sealing element 32, thereby enabling the simultaneous formation of two peripheral (i.e., edge) heat seals 15 and workpiece cutting. This is particularly important in form-fill-seal machines constructed in accordance with the principles of the present invention.

Heating element 26 is preferably made of high-temperature, thermally or electrically conductive material, such as SAMOX®, that is capable of withstanding temperatures in excess of 594° C. (1100° F.). Heating element 26 abuts a layer 24 of high-temperature backing material. Heating element 26 is electrically connected, by means of an anode 26a and a cathode 26b, to a power source 50 such that electric current may be provided to heating element 26 in order to heat it to the desired pre-sealing temperature of about 300° C. (c. 575° F.). Optionally, the power source 50 may be electrically connected to backing layer 24, when backing layer 24 is made from electrically conductive silicone rubber having a high graphite content, or other such material or combination, so that backing layer 24 itself may serve as the heating platen.

Sealing element 36 is electrically connected, by means of an anode 36a and a cathode 36b, to an impulse power unit 60 capable of bringing the temperature of sealing element 36 to sealing temperature in less than 0.5 seconds. Sealing element 36 has a tubular lumen 38 therethrough which is, in one embodiment, open to the atmosphere at a first end and fluidly connected to a vortex tube 70 at a second end. It is also contemplated that sealing element 36 may be fluidly connected to at both ends to a fluid coolant pumping apparatus, thereby forming a closed/recirculating coolant system. In this way, sealing element 36 may be instantly brought to the optimal sealing temperature of up to about 425° C (c. 800° F.) by application of impulse current to heating element 36, and immediately cooled to room temperature or below by means of forcing chilled coolant fluid 72 from vortex tube 70 through the sealing element lumen 38.

Figure 2B:
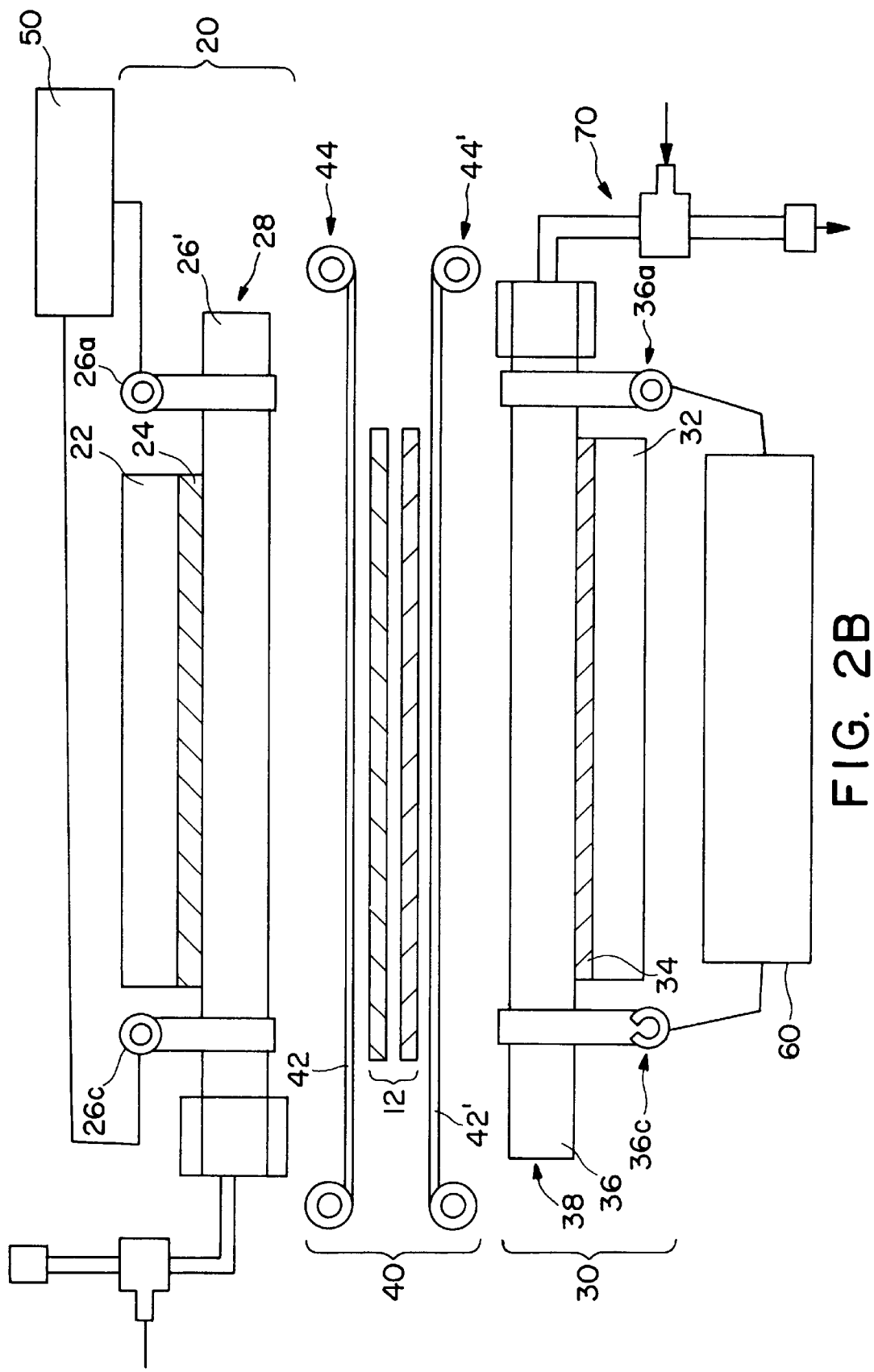
FIG. 2B is a schematic representation of a second embodiment of the apparatus of the present invention.
Figure 2C:
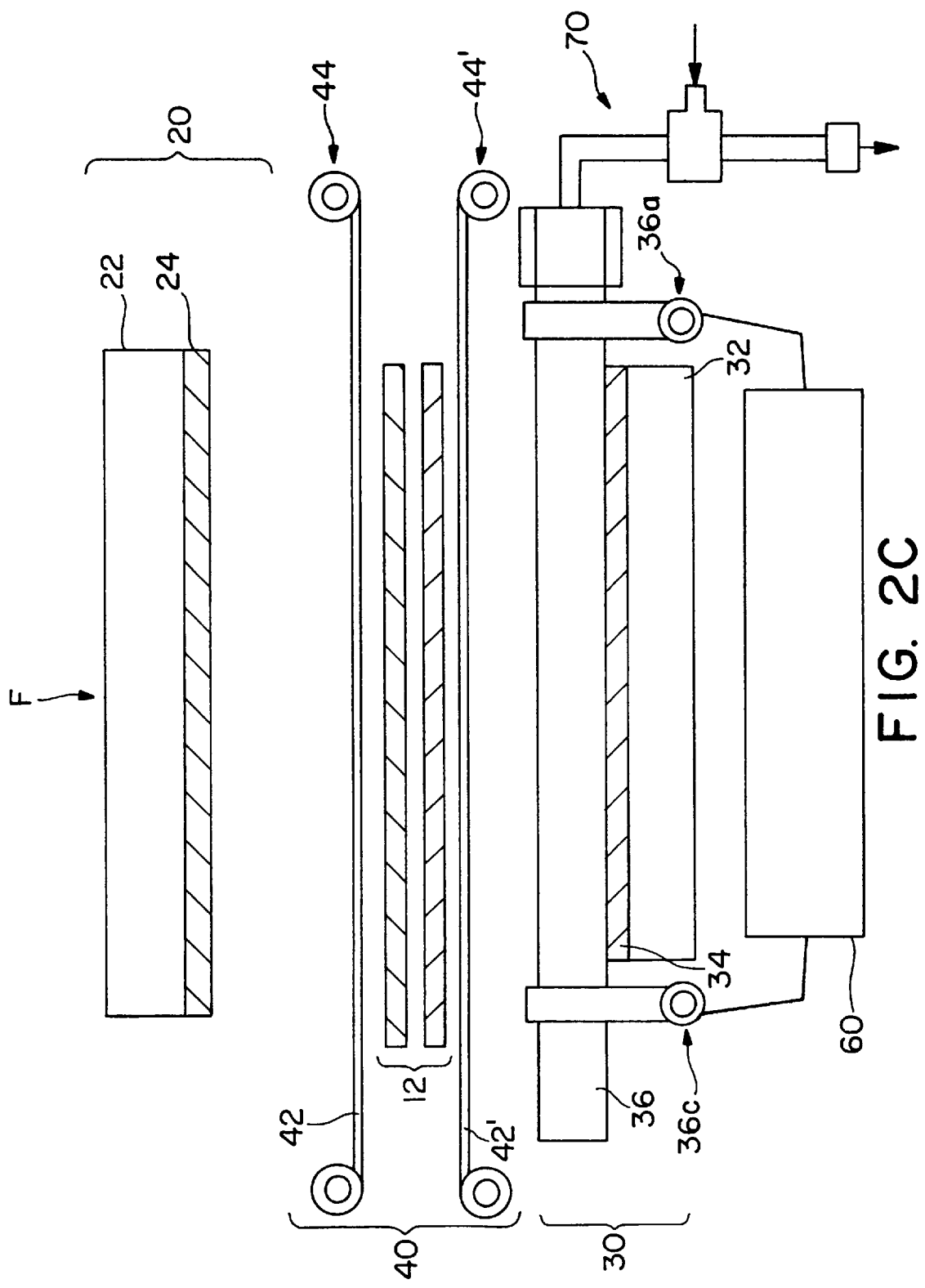
FIG. 2C is a schematic representation of a third embodiment of the apparatus of the present invention.
Figure 2D:
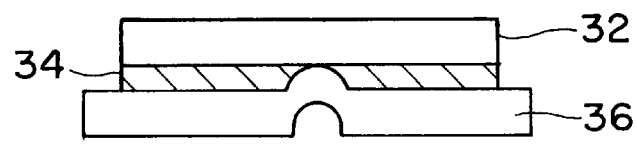
FIG. 2D is a schematic representation of a first embodiment of the sealing element of the present invention.
Figure 2E:
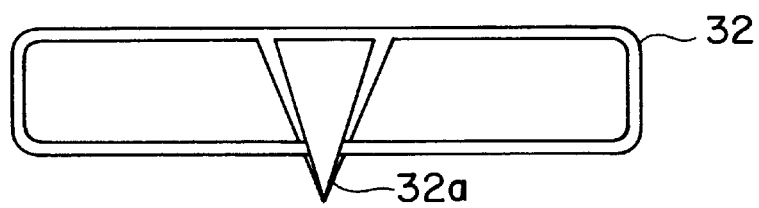
FIG. 2E is a schematic representation of a second embodiment of the sealing element of the present invention.
Figure 2F:
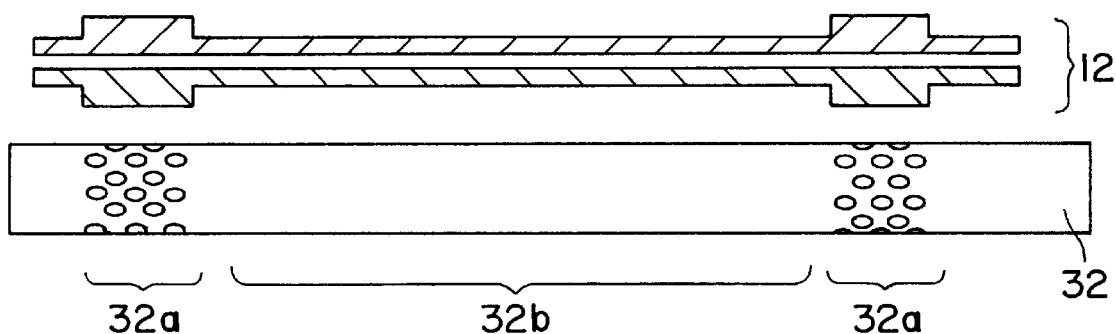
FIG. 2F is a schematic representation of a third embodiment of the sealing element of the present invention.

It is further contemplated that, where the thickness of the layers of material to be sealed is non-continuous, sealing element 32 may have regions of higher electrical resistance 32a in the vicinity where the material thickness is greater and a region of lower electrical resistance 32b where the layers are relatively thin, as shown in FIG. 2F. In one embodiment, the area of higher electrical resistance 32a may be formed by modifying element 32 such that it is discontinuous in that region, as where element 32 is provided with circular or elongated perforations, as shown in FIG. 2F. As with the case where sealing element 32 is adapted for cutting, provision of perforations in sealing element 32 reduced the cross-sectional area through which electric current can flow, thereby increasing the electrical resistance in that area and, accordingly, its temperature.

In a second, related embodiment, as shown in FIG. 2B, first compression member 20 may have a sealing element 26' that is identical in construction to sealing element 36 of second compression member 30 and that is identically disposed. This embodiment would be particularly suited for use in sealing either relatively thick layers of high-temperature film or several layers of thinner film having a relatively large aggregate thickness. Again, the total thickness of film layers that can be heat sealed according to the present invention when using a sealing component in the first compression step will vary depending upon the material to be sealed. E.g., LCP film layers having a total thickness of about 0.010" to about 0.040 may be sealed in this manner, while PVC films having a total thickness of about 0.015" to about 0.060" may be sealed using the same arrangement.

In a third embodiment, as shown in FIG. 2C, first compression member 20 does not have a heating element 26. In this embodiment, all of the sealing energy is supplied by the sealing element 36 of the second compression member 30. This embodiment would be particularly suited for use in sealing relatively thin layers of high-temperature film. The total thickness of film layers that can be heat sealed according to the present invention without use of a heating component in the first compression step will vary depending upon the material to be sealed. E.g., LCP film layers having a total thickness of about 0.008" or less may be sealed in this manner, while PVC films having a total thickness of about 0.01" or less may be sealed using the same arrangement.

Figure 3A:
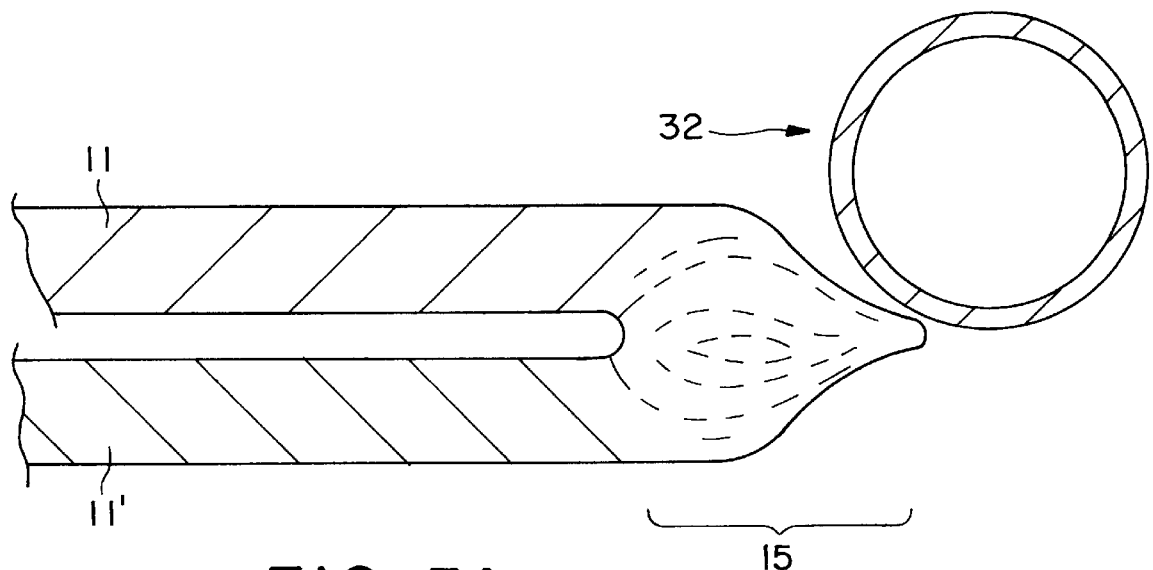
FIGS. 3A–3E show four types of heat seals that may be produced in accordance with the invention.
Figure 3B:
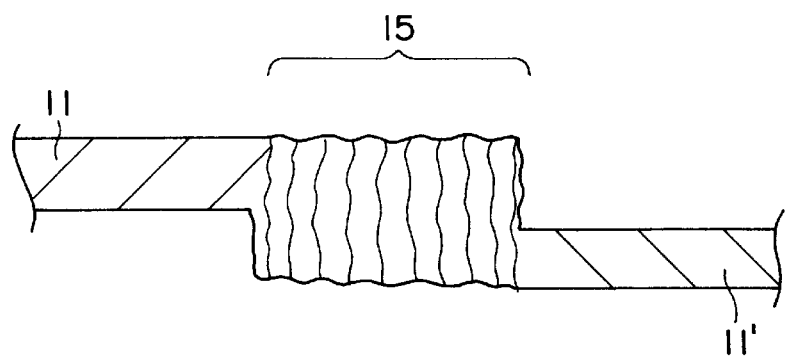
Figure 3C:
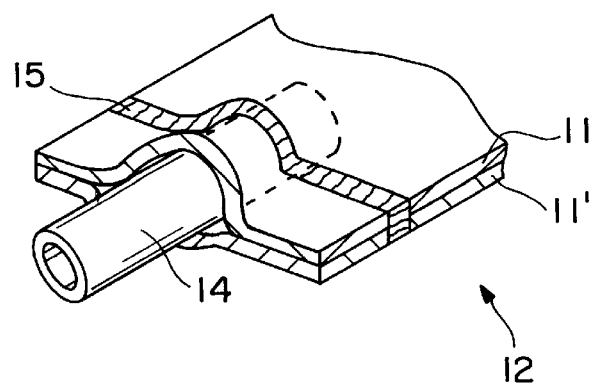
Figure 3D:
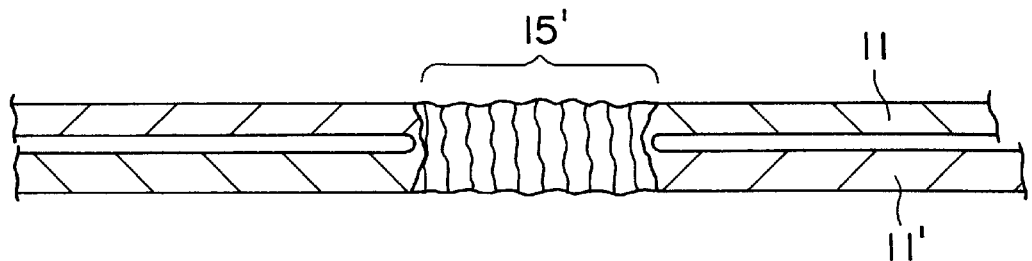
Figure 3E:
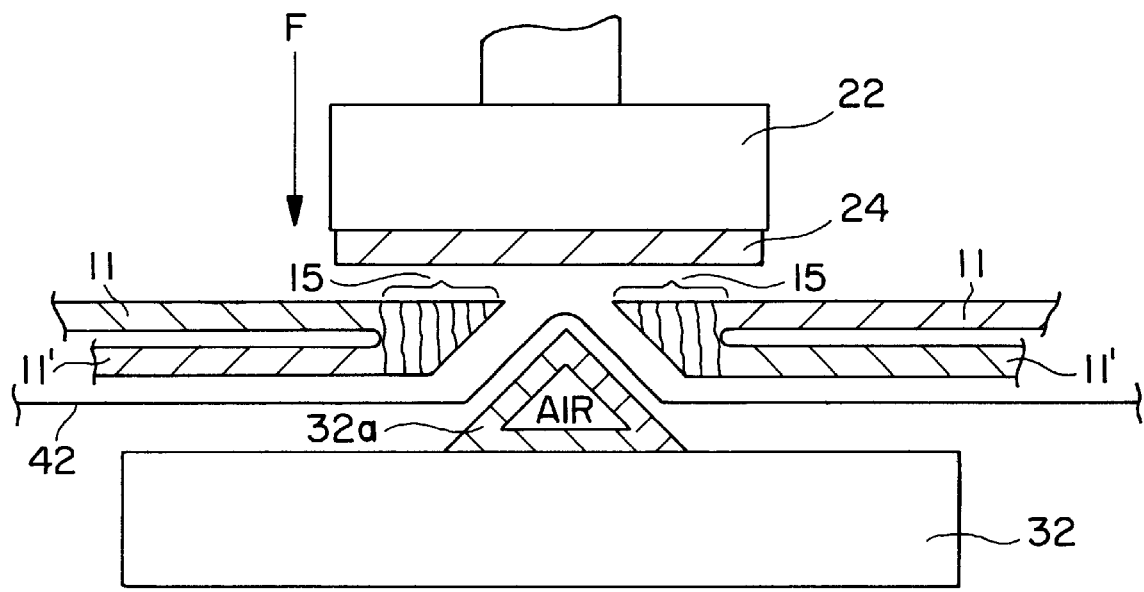

In a fourth, alternate, embodiment, an example being shown in FIG. 2D, one or both of the compression members 20 and 30 may have a three-dimensional conformation at one or more points along their surface, such that, as shown in FIG. 3E, one or more separate workpiece elements 14 having regular or irregular geometries in cross-section may be accommodated so they may be incorporated into the heat-sealed product 12 such that an hermetic seal is formed between the film layers and the incorporated element.

In a fifth embodiment related to the fourth embodiment, it is contemplated that either one or both of backing layers 24 and 34 of compression members 20 and 30 may be made of a resiliant material that is capable of accommodating the three-dimensional geometry of a separate element 14 to be incorporated into the heat-sealed product 12 such that an hermetic seal is formed between the film layers and the incorporated element.

It is important to note that, in any of the embodiments, the sheet of release material adjacent the lower temperature compression member is optimally thinner than the sheet adjacent to the higher temperature compression member, but both sheets must be between 0.001" and 0.030" thick in order for heat energy to pass through quickly enough for a seal to form.

It is also significant that heating element 26 may be brought to the desired heating temperature and maintained at that temperature throughout the sealing process or intermittently brought to the desired heating temperature via pulses that alternate with the pulses sent to sealing element 36.

It is further significant that coolant fluid 62 may be introduced to the tubular lumen of a sealing element either continuously or intermittently alternating with the heat pulse. Obviously, continuous flow will require greater heat energy to be applied to the sealing element in order to achieve the same sealing temperature as where no coolant is flowing through the element during sealing. Suitable coolant fluids include air and other gases that are non-reactive at the high temperatures required of this invention, such as nitrogen, and liquids, such as silicone and perfluorocarbon fluids, and other fluids that have a high cooling capacity and high temperature resistance.

Additionally, as shown in FIG. 2G, for seal lengths greater than 50 cm, coolant fluid 62 may be simultaneously introduced at the ends of sealing element 36 and evacuated via exit orifice 33 disposed about midway therebetween in order to lessen the possibility of incomplete seal formation due to a temperature gradient created along the length of sealing element 36.

It is also contemplated that the localized phase change required to seal the material to be sealed may be accomplished by means of (a) a heating element comprising a movable fixed or rolling sealing die, (b) focused laser or focused IR lamps, (c) electron beams, (d) super-heated air-jets, (e) low-temperature plasma, (f) preheating the seal area and sequential application of ultrasound, RF, or IR (optionally focused), (g) vibrating either or both of heating element 26 or sealing element 36 in combination with another heat source, (h) vibrating workpiece 12 in combination with another heat source, (i) disposing metal strips along the seal area and sequential induction heating by means of magnetic or microwave/RF energy such that the metal strips are or are not incorporated into the seal, or (j) use of susceptor material comprising metal particles, electrical conductive inks (such as enamel-, kapton-, metal-, or carbon-ink), or electrical resistive inks along the seal area and sequential induction heating by means of magnetic or microwave/RF energy, wherein the temperature attained varies with the amount and surface area coverage of the suseptor material. These alternate methods are particularly well suited to sealing film to solid (i.e., molded, vacuum-formed, etc.) thermoplastic workpieces or for fusing or welding two solid thermoplastic workpieces.

It is particularly contemplated that a sealing die comprising a higher-temperature sealing element and at least one lateral flange capable of attaining temperatures below those attained by the sealing element may be used in accordance with the principles of the present invention. During use of this type of sealing die, the sealing element is preceded along a sealing axis by the at least one lateral flange, as where the flange surrounds the sealing element circumfirentially. Thus, the at least one lateral flange preheats the area to be sealed and provides compressive force to the workpiece to ensure effective sealing by the higher temperature sealing element. It is further contemplated that, rather than being tubular, sealing element 36 may be provided with multiple channels through which coolant could flow. Alternately, sealing element 36 may be provided with cooling fins to increase the surface area of the element across which heat energy could dissipate. These fins optionally may have coolant flowing over them to accelerate heat dissipation. Where a sealing die is used to form the heat seal, the sealing die may be cooled by having coolant flow over or through it.

Alternately, the coolant could contact, either directly or indirectly by means of a chilled element or sealing die, the sealed region. Where a focused energy source is used to form the seal, and where the seal region has a low thermal mass, cooling will occur rapidly once the energy source is removed. Alternately, a heat sink material may be embedded near the seal region in order to draw off heat energy.

It is additionally contemplated that positive or negative air or fluid pressure (e.g., air jets) can be used to urge the release of workpiece 12 from compression members 20 and 30.

It is important to note that the apparatus of the present invention may form a variety of heat seal shapes, including but not limited to linear seals, regular and irregular geometric seals, disk or "button" seals, free-form seals, and the like. High-temperature linear seals 15 of the present invention may be formed along or adjacent one or more common edges between sheets 11 and 11' of thermoplastic film that are disposed such that the sheets largely, if not completely, overlap, as shown in FIG. 3A. Such seals 15 may also be formed along or adjacent the common edge of sheets 11 and 11' of thermoplastic film disposed such that they have only a relatively small area of overlap, as shown in FIG. 3B. Further, these seals may be formed in films that are creased or pleated or have integrally sealed closure elements. It is also contemplated that disk or "button" seals 15' may be formed anywhere that two or more sheets 11 and 11' of thermoplastic film come in contact, as shown in FIG. 3D.

II. PROCESS

The apparatus of the present invention is capable of creating three novel seal categories. The first type of heat seal is specific to monolithic films (i.e., single-ply films manufactured without fillers and not laminated to other materials). Suitable materials for use in forming this first type of seal are LCP, PEEK, polyether-sulfone, polyimide, and other high temperature, engineering grade film materials that are designed to withstand in-use temperatures ranging from about 205° C. (c. 400° F.) to about 580° C. (c. 1000° F.).

In the case of unmodified LCP film, with a melting point of 420° C. (788° F.), effective heat sealing of two or more layers has been impossible with commercially available heat sealing machines that cannot adequately fuse high temperature materials. Effective reconsolidation of monolithic, unlaminated LCP films up to about 0.001" thick is now possible.

In the first category of seal of the present invention, the layers of monolithic high temperature film are sealed by bringing the temperature of the sealing element above about 425° C. (c. 800° F.) quickly (in about 0.05 second) and rapidly returning the heat sealed region to room temperature (in about 3 seconds or less).

The second category of novel heat seal that can be formed by the present invention is of LCP films having a thickness ranging from 0.0005" to 0.005" combined with other thermoplastic films via high temperature adhesive "tie" layers and a seal that commingles all of the laminated materials including layers of LCP film as the core or barrier layer. The LCP core layer, which must have a thickness of about 0.005" or less is secured, initially by a high temperature adhesive layer, to other thermoplastic films, including metallized films. These non-LCP films collectively, have melting points ranging from 300° F. to 600° F., far below those of the LCP films. This second category of seal enables the commingling of LCP core layers with the lower melting points of the other plastics and the result is a combination hermetic seal. The novel use of high heat, time, and pressure creates a fused edge of all the materials, including the LCP core without any deleterious effect on the lower temperature films. This is possible because LCP film having a thickness of about 0.005" or less can be dispersed, mixed with, and reassembled during the heat and pressure process of the sealing apparatus and in fact this LCP dispersion adds mechanical and chemical properties to the lower temperature materials.

This is accomplished by commingling the sealed edges of the total laminate, including the thin LCP layers using a median temperature of 425° C. (c. 800° F.), but with a very short impulse (less than 0.5 second) and immediately cooling the commingled materials at the seal line to room temperature in less than 3 seconds. The speed of the heat and cool application prevents all the commingled layers from deteriorating. High temperature adhesives used as tie-layers, are also commingled and integrated into the seal mix area along with the LCP core layers and outer laminated thermoplastic film layers. The seal invention in this combination of materials is a seal that can fuse both high and low temperature films, such as LCP and low density metallized polyester or polyethylene. This sealing mode enables the manufacture of high barrier, hot-fill packaging and other high temperature applications, such as autoclavable medical bags, that need the barrier and temperature properties of LCP.

The third type of heat seal of the present invention is the hermetic sealing of a separate workpiece element 14 transversely to the seal line, as shown in FIGS. 3C, 4D, 4F, and 4J. Examples of such separate elements are valves, probes, leads, tubes, and other structural and functional elements having regular or irregular geometries in cross-section and optionally defining a lumen. These separate elements may be made from various metals, including copper and stainless steel; polyolefins; graphite and graphite-filled thermoplastics; and other materials that are difficult, if not impossible, to assemble using conventional heat sealing technology.

III. PRODUCTS

The present invention contemplates products manufactured solely from two or more layers of heat-sealed, high-temperature thermoplastic film material, particularly LCP films, or such film layers laminated to other materials, such as low temperature thermoplastics. The present invention also contemplates such products in combination with separate elements, such as valves, probes, leads, tubes, and the like made from melt processable materials.

Figure 4A:
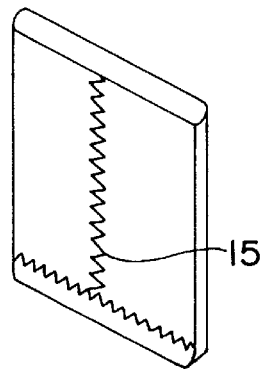
FIGS. 4A–4J show various heat-sealed products of the present invention.
Figure 4B:
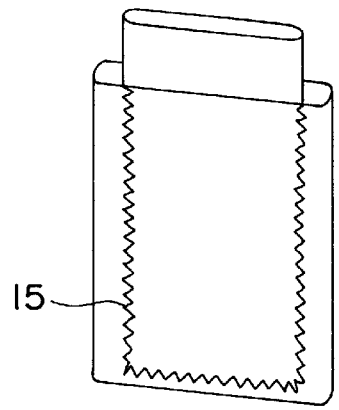
Figure 4C:
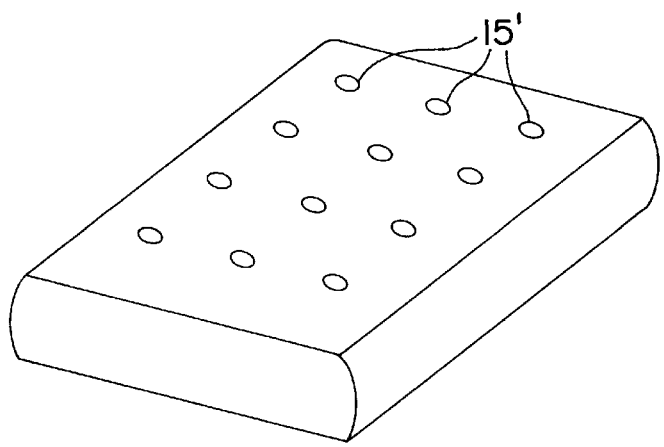
Figure 4D:
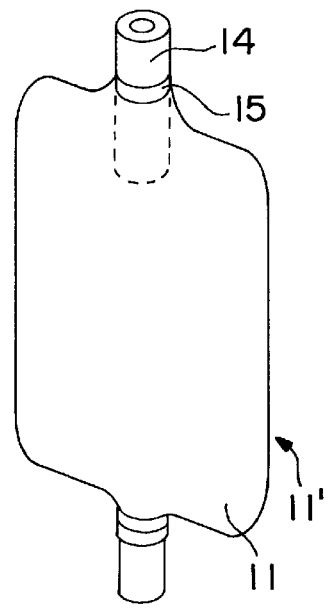
Figure 4E:
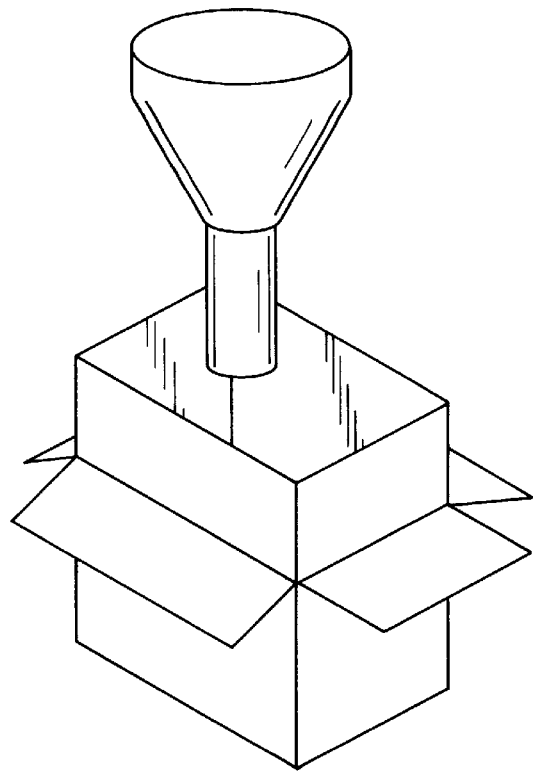
Figure 4F:
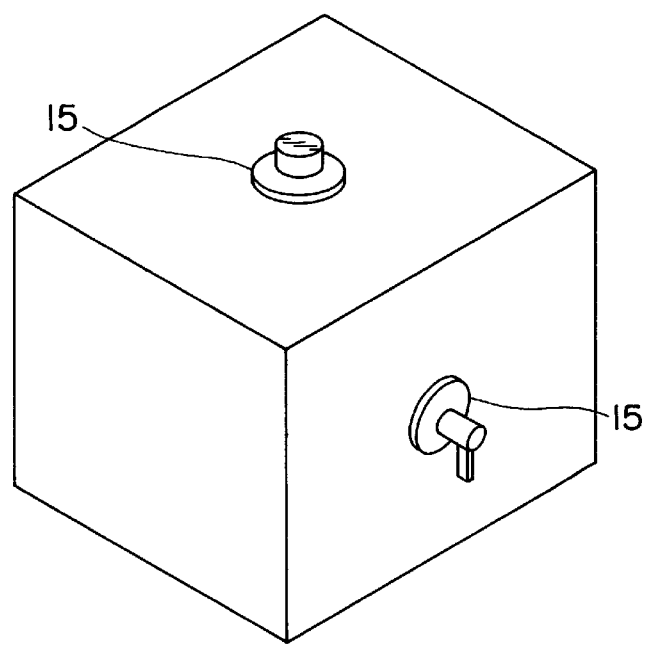
Figure 4G:
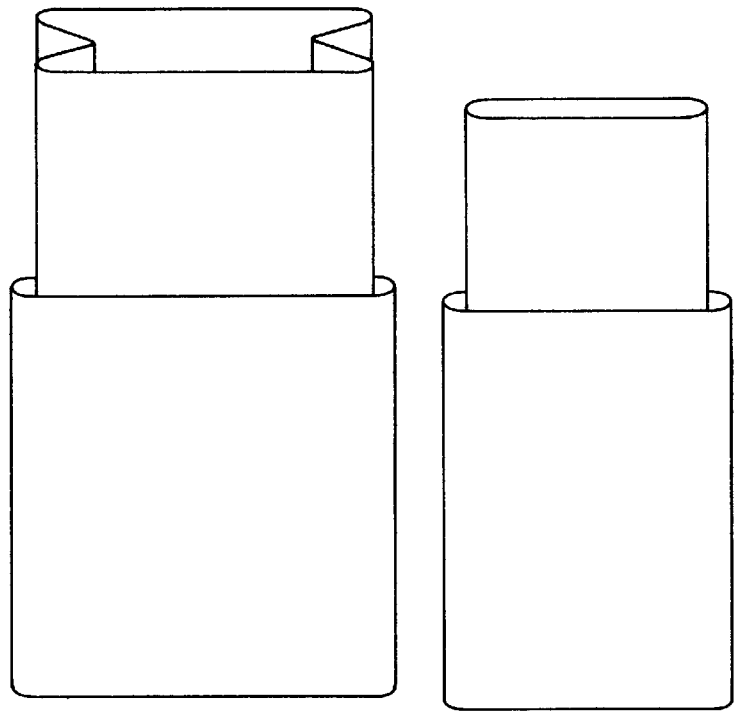
Figure 4H:
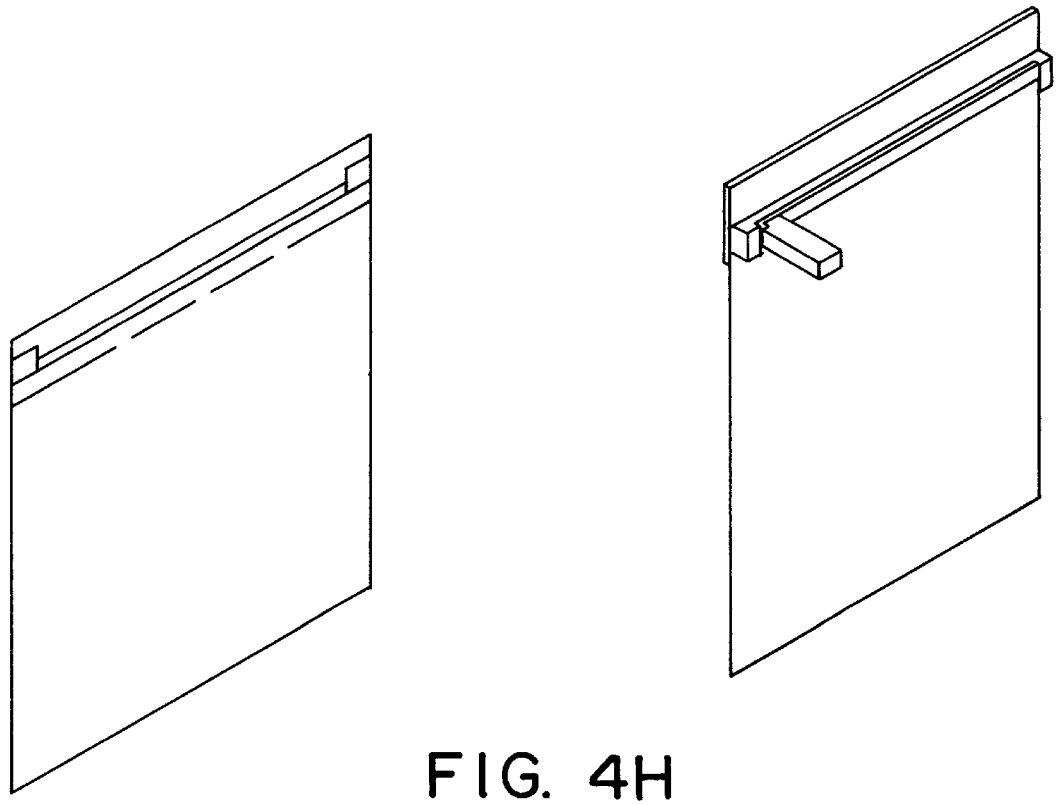

As shown in FIGS. 4A–J, typical applications of LCP films include form-fill-seal bags for hot-fill packaging with extended shelflife and improved moisture vapor and oxygen transmission characteristics (FIG. 4A); shipping sacks with improved hot-fill properties and lower material weight for storing and transporting up to 100 lbs of product, and bag-in-box and liner-in-drum containers up to 55 gallon capacity for hot liquid or hot dry-fill products, hazardous materials, and other materials requiring extreme performance either during packaging or extended storage (FIGS. 4E and 4G). Currently, these products are manufactured with lower-temperature thermoplastics having less desirable barrier and thermal properties.

Other applications include autoclavable medical storage bags with improved temperature resistance and shelflife based on the high barrier properties and resistance to radiation of LCP; photographic/X-ray film packaging, wherein LCP extends the product's shelflife; electrical wire and underwater cable insulation materials; products incorporating high-temperature membranes; air bladders, such as inflatable mattresses (FIG. 4C), that do not deflate due to LCP's barrier properties; pharmaceutical packaging; packaging for solvents, perfumes, volatile organic materials, and caustic/acidic materials; "clean harbors" slow-release applications; high-performance abrasive sheets for grinding and finishing applications; fuel tank liners; water heater tank liners; vacuum flask liners; cooking oven liners; reflective film substrates; electrical components, such as capacitors, transistors, resistors, and flexible circuits; videotape/magnetic tape materials; computer disks (hard and floppy); credit card/smartcard stock; compact discs; water recirculation grids; countercurrent exchangers, especially for electrolytic processes; cryogenic storage materials; high temperature tape products; injection molding releases; desiccating bags; electronic components packaging; high temperature woven fabrics (e.g., papermaking felts); weather balloons, blimps, etc.; emergency personal flotation devices; foil replacements; tobacco/cigarette/ cigar packaging; food packaging; reusable/resealable airtight storage bags (FIG. 4H); vacuum packaging materials; blood storage and drug delivery bags having an integral sealed valve (FIG. 4D); blow-molded articles having integral structural elements, such as spigots (FIG. 4F); electrovoltaic cells having an anode, a cathode, and electrolyte sealed within a LCP bag (FIG. 4J); and any other applications requiring superior barrier properties, burst strength, and resistance to thermal and chemical breakdown.

It is also contemplated that the sealing process can emboss, embed, or imprint a company logo, inventory tracking or product identification number, or other device.

Figure 4I:
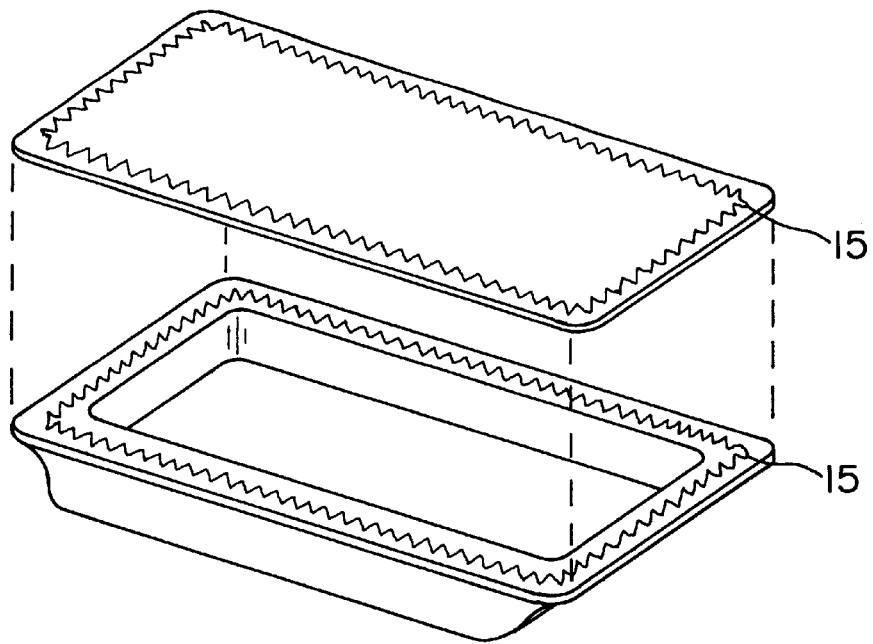
Figure 4J:
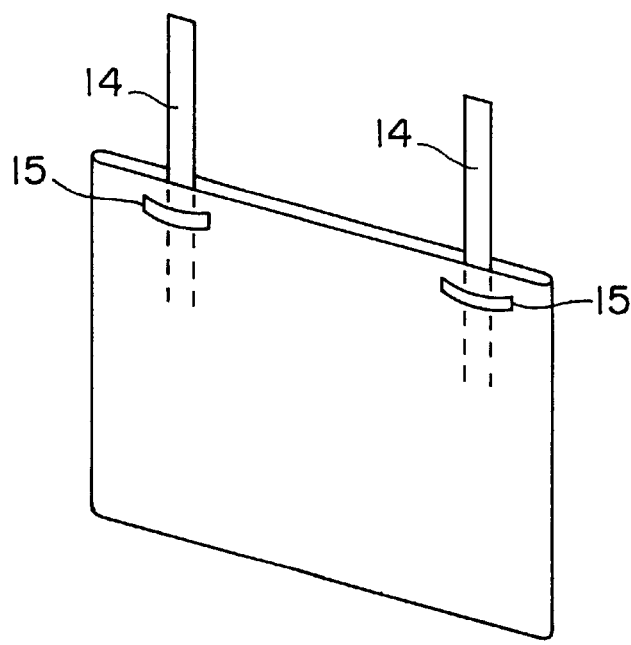

It is contemplated further that medical devices may be vacuum-sealed in packaging comprising LCP film and subsequently sterilized by irradiation, steam, gas, UV, etc. (FIG. 4I).

Additional applications include those that can benefit from the combination of high temperature thermoplastic films and other thermoplastic films having different, but advantageous properties. Examples of such applications are anti-static bags formed from a layer of Faraday Cage film (a metallized antistatic thermoplastic) disposed within an outer LCP bag such that the inner layer is provided with electrostatic discharge means in electroconductive communication with the exterior of the anti-static bag (FIG. 4B). This particular application takes advantage of LCP's superior barrier properties, as well as the antistatic properties of traditional static-control packaging bags.

Prior to this invention, LCP films were restricted from use as a complete and uniformly sealed package that can offer the superior barrier and temperature properties of LCPs for control of moisture vapor transmission and oxygen penetration which limits the shelflife of products. Competing barrier materials, such as MYLAR®, and other barrier films cannot match the barrier or high-temperature properties of LCP films.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A heat sealing apparatus for sealing high-temperature thermo-plastic material having:
   (a) a first compression member, having a first sealing surface;

(b) a second compression member, having a second sealing surface, that opposes the first compression member and that has an electrically conductive sealing element having a first end and a second end and being in fluid communication with a vortex tube capable of cooling a coolant fluid disposed therethrough and further being attached to an electrical power source and backed by a layer of high-temperature, resiliant material capable of supporting the sealing element; and (c) two floating sheets or tapes of high-temperature release material each having a thickness between 0.001" and 0.030" disposed therebetween but not in constant contact therewith wherein the sealing element is capable of being flash-heated to a maximum temperature of about 1100° C. (c. 2000° F.) by application of electric current from the power source and immediately cooled to room temperature or below by contacting the sealing element with chilled coolant fluid from the vortex tube via the first end of the sealing element, such that a thermoplastic workpiece to be sealed may be inserted between the floating sheets so that compression of the first and second compression members against the workpiece, together with flash heating and cooling of the sealing element, achieves a heat seal in the workpiece.

2. The heat-sealing apparatus as in claim 1, wherein the workpiece comprises at least two layers of thermoplastic film.

3. The heat-sealing apparatus as in claim 1, wherein the opposed compression members are adapted to cut the workpiece after sealing.

4. The heat-sealing apparatus as in claim 1, wherein the sealing element is of tubular construction and defines a lumen that is in fluid communication with the vortex tube such that the chilled coolant fluid flows through the lumen.

5. The heat-sealing apparatus as in claim 4, wherein the coolant fluid flows through the lumen continuously.

6. The heat-sealing apparatus as in claim 4, wherein the coolant fluid flows through the lumen intermittently and alternating with the application of electric current to the sealing element.

7. The heat-sealing apparatus as in claim 1, wherein the sealing element is provided with multiple channels through which coolant may flow.

8. The heat-sealing apparatus as in claim 1, wherein the sealing element is provided with cooling fins across which heat energy could dissipate.

9. The heat-sealing apparatus as in claim 8, wherein the cooling fins may be disposed such that coolant fluid may flow over them to accelerate heat dissipation.

10. The heat-sealing apparatus as in claim 1, wherein the first compression member has a heating element attached to a power source and backed by a layer of high-temperature, resiliant material capable of supporting the heating element.

11. The heat-sealing apparatus as in claim 10, wherein the heating element is capable of being heated to a temperature in excess of 594° C. (1100° F.), most preferably to a temperature of about 300° C. (c. 575° F.).

12. The heat-sealing apparatus as in claim 10, wherein the heating element is capable of being heated to a desired heating temperature and maintained at that temperature throughout the sealing process.

13. The heat-sealing apparatus as in claim 10, wherein the heating element is capable of being flash-heated to a desired temperature.

14. The heat-sealing apparatus as in claim 10, wherein the heating element may be intermittently brought to the desired heating temperature via electric pulses that alternate with the electric pulses sent to the sealing element.

15. The heat-sealing apparatus as in claim 1, wherein the first compression member has a heating platen of high-temperature, electrically conductive resiliant material attached to a power source.

16. The heat-sealing apparatus as in claim 1, wherein the first compression member has an electrically conductive, tubular sealing element defining a lumen that is in fluid communication with a vortex tube capable of cooling a coolant fluid flowing therethrough, the sealing element further being attached to an electrical power source and backed by a layer of high-temperature, resiliant material capable of supporting the sealing element.

17. The heat-sealing apparatus as in claim 1, wherein at least one of first and second compression members has a three-dimensional conformation at least one point along its sealing surface, such that at least one separate workpiece element having regular or irregular geometries in cross-section may be accommodated so it may be incorporated into the heat-sealed product such that an hermetic seal is formed between the film layers and the incorporated element.

18. The heat-sealing apparatus as in claim 1, wherein at least one of first and second compression members is made of a resiliant material that is capable of accommodating a workpiece comprising at least two layers of thermoplastic film and having at least one separate workpiece element with a regular or irregular geometry in cross-section disposed therebetween such that the separate element may be incorporated into the finished heat-sealed workpiece such that an hermetic seal is formed between the film layers and the incorporated element.

19. The heat-sealing apparatus as in claim 1, wherein the sheet of release material adjacent the first temperature compression member is optimally thinner than the sheet adjacent to the second temperature compression member.

20. The heat-sealing apparatus as in claim 1, wherein, for seal lengths greater than about 50 cm, the sealing element has a coolant fluid exit orifice disposed about midway between the ends of the element, such that the coolant fluid may be simultaneously introduced at each end of the sealing element and evacuated via the exit orifice.

21. The heat-sealing apparatus as in claim 16, wherein, for seal lengths greater than about 50 cm, the sealing element has a coolant fluid exit orifice disposed about midway between the ends of the element, such that the coolant fluid may be simultaneously introduced at each end of the sealing element and evacuated via the exit orifice.

22. The heat-sealing apparatus as in claim 1, wherein the localized phase change required to seal the material to be sealed may be accomplished by means selected from the group consisting of (a) a heating element comprising a movable fixed or rolling sealing die;

(b) focused laser or focused IR lamps;

(c) electron beams;

(d) super-heated air-jets;

(e) low-temperature plasma;

(f) preheating the seal area and sequential application of ultrasound, RF, or IR (optionally focused);

(g) vibrating at least one of the heating element and the sealing element in combination with another heat source;

(h) vibrating the workpiece in combination with another heat source;

(i) disposing metal strips along the seal area and sequential induction heating by means of magnetic or microwave/RF energy such that the metal strips are or are not incorporated into the seal; and (j) use of susceptor material selected from the group consisting of metal particles, electrical conductive inks, and electrical resistant inks along the seal area and sequential induction heating by means of magnetic or microwave/RF energy.

23. The heat-sealing apparatus as in claim 22, wherein the localized phase change required to seal the material to be sealed may be accomplished by said means in combination.

24. The heat-sealing apparatus as in claim 22, wherein the coolant contacts the sealed region.

25. The heat-sealing apparatus as in claim 1, wherein a heat sink material is embedded near the seal region in order to draw off heat energy.

26. The heat-sealing apparatus as in claim 1, further comprising means for introducing positive or negative air or fluid pressure to the workpiece in order to urge the release of the workpiece from the compression members.

27. A heat-sealing element adapted for use with the apparatus in claim 1, or for retrofitting other, existing bag-making machines, wherein said sealing element is capable of sealing polyethylene-based, low-temperature materials having a total thickness less than about 0.020", said sealing element comprises a hollow core for accelerated cooling of heat seals.

28. The hollow sealing element, as in claim 27, further comprising a raised ridge capable of simultaneous heat-sealing and material cutting while coolant is introduced through said hollow core.

29. A heat sealing apparatus for sealing high-temperature thermoplastic material having:

(a) a first hollow flat band compression member, having a first sealing surface;

(b) a second flat band compression member, having a second sealing surface opposing the first compression member;

(c) means for rapid impulse heating at least said first sealing surface to provide flash heating, said rapid impulse heating means having an electrically conductive sealing element having a first end and a second end; and (d) means for rapidly cooling at least said one sealing surface, said rapidly cooling means being in fluid communication with a vortex tube capable of providing a coolant fluid at least within said first hollow flat band compression member for immediately cooling said one sealing surface to room temperature or below by contacting the sealing element with chilled coolant fluid from the vortex tube, whereby a high temperature thermo-plastic workpiece to be sealed may be inserted between the first and second compression members, together with flash heating and cooling of the sealing element, thereby to achieve a heat seal in the workpiece.

30. Apparatus as defined in claim 29 wherein said flat bands each have corresponding bends so that they together form a sealing surface for a tube to a sheet of high temperature thermoplastic material.

31. A method of forming a heat seal in high-temperature thermoplastic film, comprising the steps of:

(a) providing apparatus having
(i) a first compression member, having a first sealing surface;
(ii) a second compression member, having a second sealing surface, that opposes the first compression member and that has an electrically conductive sealing element having a first end and a second end and being in fluid communication with a vortex tube capable of cooling a coolant fluid disposed therethrough and further being attached to an electrical power source and backed by a layer of high-temperature, resiliant material capable of supporting the sealing element; and
(iii) two floating sheets or tapes of high-temperature release material each having a thickness between 0.001" and 0.0301" disposed therebetween but not in constant contact therewith wherein the sealing element is rapable of being flash-heated to a maximum temperature of about 1100° C. (c. 2000° F.) by application of electric current from the power source and immediately cooled to room temperature or below by contacting the sealing element with chilled coolant fluid from the vortex tube via the first end of the sealing element;

(b) inserting between the two floating sheets of high-temperature release material a high-temperature thermoplastic workpiece to be sealed having at least two boundary edges;

(c) providing a compressive force sufficient to bias the first and second compression members against the workpiece;

(d) simultaneously applying sufficient electric current from the power source to the heating element to flash-heat the element to a desired sealing temperature, thereby heat sealing a desired portion of the workpiece;

(e) subsequently contacting the sealing element with chilled coolant fluid introduced to the sealing element lumen from the vortex tube via the first end of the sealing element, in order to return the heat sealed portion of the workpiece to at least about room temperature; and.

(f) removing the compressive force from the first and second compression members such that the heat-sealed workpiece is released from the apparatus.

32. The method, as claimed in claim 31, wherein the high-temperature release material is polyimide film.

33. The method, as claimed in claim 31, wherein the high-temperature thermoplastic workpiece to be sealed is a film having a thickness up to about 0.080" selected from the group consisting of liquid crystal polymer, liquid crystal polyester, PEEK, polyether-sulfone, potyimide, and other high temperature, engineering grade film materials that are designed to withstand in-use temperatures ranging from about 205° C. (c. 400° F.) to about 580° C. (c. 1000° F.).

34. The method, as claimed in claim 31, wherein the heat seal is created between two separate layers, having a total thickness up to about 0.080", of monolithic film selected from the group consisting of liquid crystal polymer, liquid crystal polyester, PEEK, polyether-sulfone, polyimide, and other high temperature, engineering grade film materials that are designed to withstand in-use temperatures ranging from about 205° C. (c. 400° F.) to about 580° C. (c. 1000° F.).

35. The method, as claimed in claim 34, wherein the two layers overlap essentially completely and the heat seal is created along at least one common edge.

36. The method, as claimed in claim 34, wherein the two layers overlap only partially and the heat seal is created along their common edge.

37. The method, as claimed in claim 31, wherein the heat seal is created between one layer of monolithic film selected from the group consisting of liquid crystal polymer, liquid crystal polyester, PEEK, polyether-sulfone, polyimide, and other high temperature, engineering grade film materials that are designed to withstand in-use temperatures ranging from about 205° C. (c. 400° F.) to about 580° C. (c. 1000° F.), the layer being folded over against itself such that the total thickness of film to be sealed is up to about 0.080".

38. The method, as claimed in claim 31, wherein the temperature of the sealing element is brought to a desired sealing temperature above about 425° C. (c. 800° F.) in about 0.05 seconds.

39. The method, as claimed in claim 38, wherein the heat sealed region of the workpiece is returned to at least about room temperature in about 3 seconds or less.

40. The method, as claimed in claim 31, wherein the heat seal is created between a first layer, having a thickness of about 0.0005" to about 0.005", of high-temperature thermoplastic film selected from the group consisting of liquid crystal polymer, liquid crystal polyester, PEEK, polyether-sulfone, polyimide, and other high temperature, engineering grade film materials that are designed to withstand in-use temperatures ranging from about 205° C. (c. 400° F.) to about 580° C. (c. 1000° F.), and a second layer of lower-temperature thermoplastic film.

41. The method, as claimed in claim 40, wherein the layer of lower temperature thermoplastic film is a film selected from the group consisting of thermoplastic films having a melting point of about 149° C. (c. 300° F.) to about 315° C. (c. 600° F.).

42. The method, as claimed in claim 40, wherein a pair of first and second layers are disposed such that the inner layers comprise high-temperature thermoplastic film and the outer layers comprise lower temperature thermoplastic film, thereby allowing for the formation of a heat-sealed workpiece having a high-temperature thermoplastic film core.

43. The method, as claimed in claim 40, wherein the first and second layers are combined by means of a high-temperature adhesive layer disposed therebetween.

44. The method, as claimed in claim 31, wherein the workpiece comprises a separate element disposed transversely to the heat seal and partially thereacross.

45. The method, as claimed in claim 44, wherein the separate transverse element is selected from the group consisting of valves, probes, leads, tubes, and other structural and functional elements having regular or irregular geometries in cross-section.

46. The method, as claimed in claim 43, wherein the separate transverse element defines a lumen.

47. The method, as claimed in claim 44, wherein the separate transverse element is selected from the group consisting of metals, including copper and stainless steel; polyolefins; graphite and graphite-filled thermoplastics; and other materials that are difficult, if not impossible, to assemble using conventional heat sealing technology.

* * * * *